United States Patent Office

3,839,387
Patented Oct. 1, 1974

3,839,387
PROCESS FOR PREPARING N-TRIMETHYL-SILYLACETAMIDE
Ta-Sen Chou and James R. Burgtorf, Indianapolis, Ind., assignors to Eli Lilly and Company, Indianapolis, Ind.
No Drawing. Filed Nov. 14, 1973, Ser. No. 415,697
Int. Cl. C07f 7/10
U.S. Cl. 260—448.2 E                    11 Claims

ABSTRACT OF THE DISCLOSURE

N-Trimethylsilylacetamide is prepared by reacting one mole of hexamethyldisilazane with two moles of acetamide and continuously separating the ammonia by-product from the reaction mixture during the period of its generation.

BACKGROUND OF THE INVENTION

This invention is directed to a process for preparing N-trimethylsilylacetamide. N - trimethylsilylacetamide is claimed in United States Pat. No. 2,876,234. Generally, two methods for preparing N-trimethylsilylacetamide are described in this as well as other patents, see for example, U.S. Pats. Nos. 2,876,209 and 3,397,220.

One of the described methods involves the reaction of an amide, in this case, specifically, acetamide, with a halosilane, specifically trimethylchlorosilane. This described reaction is rather cumbersome since, as a by-product in the formation of the silylated amide compound, HCl is generated. In order to ensure the ongoing of the reaction, it is essential to inactivate the HCl which is formed. This can be accomplished by including a suitable tertiary amine reagent as part of the reaction mixture. The tertiary amine scavenges HCl upon formation and combines with it to form the corresponding amine hydrochloride salt. This reaction thus necessitates the use of substantial quantities of an amine reagent, and, correspondingly, results in production of large quantities of an amine hydrochloride salt as by-product. Suitable methods for disposal of this by-product must be found. Furthermore, since a large quantity of the amine hydrochloride salt is formed, it is necessary to provide a solvent medium for the reaction. This also results in added expense and requires increased physical facilities. Once the required solvent is employed, it is necessary, after removal of the amine hydrochloride salt from the reaction mixture, to isolate the resulting silylated amide product from the solvent mixture. It is apparent, therefore, that production of silylated amide, and specifically N-trimethylsilylacetamide, by this method is both cumbersome and expensive.

Another prior art method for preparing N-trimethylsilylacetamide is by treatment of acetamide with $t$-butylaminotrimethylsilane. This reaction produces $t$-butylamine as by-product. Continued formation of desired product by this reaction necessitates selection of conditions which facilitate removal from the reaction mixture of the $t$-butylamine upon its formation. Due to the boiling point of $t$-butylamine, the conditions of reaction are quite limited. Additionally, separation of residual quantities of $t$-butylamine normally is required before the product, N-trimethylsilylacetamide, can be isolated in reasonable purity. This may require distillation of the product residue. Furthermore, the starting material, $t$-butylamino-trimethylsilane, is not readily available, and a means for disposal of the $t$-butylamine which is formed in an amount of one mole per each mole of N-trimethylsilylacetamide must be discovered.

These deficiencies are avoided by the process of this invention. It is therefore an object of this invention to provide a facile method for producing N-trimethylsilylacetamide in highly pure form, from readily available starting materials, and without the formation of difficultly removable by-products.

SUMMARY OF THE INVENTION

In broad embodiment, this invention relates to a process for preparing N-trimethylsilylacetamide, which comprises contacting hexamethyldisilazane with acetamide in a ratio of at least one mode of hexamethyldisilazane per each two moles of acetamide at a temperature of from about 40° C. to about 125° C. and for a period during which ammonia is generated from the mixture, and continuously removing the ammonia from the mixture during the period of its generation.

DETAILED DESCRIPTION OF THE INVENTION

As previously stated, this invention is directed to a process for the production of N-trimethylsilylacetamide. It involves the interaction of hexamethyldisilazane and acetamide. In accordance with the process of this invention, it has been discovered that the interaction of these two reagents can be carried out in the absence of any other substances. The process of this invention in its essence thus involves simply the mixing of hexamethyldisilazane and acetamide at an elevated temperature and for a period long enough to achieve chemical combination of the two reactants with formation of the desired product. Other specified conditions and reagents can be incorporated in the process, and these would tend to promote the forward direction of the reaction and, correspondingly, to shorten reaction time and/or to otherwise improve reaction convenience; however, none of these added conditions is required for the reaction to proceed.

Thus, the process of this invention contemplates reaction of one mole of hexamethyldisilazane, each molecule of which affords two trimethylsilyl groups, with each two moles of acetamide. Generally, the relative amounts of reactants are maintained at a molar ratio of approximately 1:2 hexamethyldisilazane to acetamide, although an excess of hexamethyldisilazane over the stoichiometric requirement can be employed. Preferably, a molar excess of from about 2.5% to about 30% of the hexamethyldisilazane based upon the stoichiometric requirement of the hexamethyldisilazane is employed.

Upon mixing of the reactants, the reaction proceeds at a temperature of from about 40° C. to about 125° C. and is evidenced by the evolution of ammonia. Preferably, the reaction is carried out at a temperature of from about 45° C. to about 90° C. The reaction is based upon an equilibrium relationship, and, thus, the reaction is driven forward generally in direct dependence upon the evacuation from the reaction mixture of the ammonia as it is generated. Thus, any condition or set of conditions which would promote the ready removal of the ammonia from the reaction mixture will also tend to promote the ongoing of the reaction, and thus, the production of N-trimethylsilylacetamide.

Although the reaction will proceed by the simple mixing and heating of the two reactants, it has been discovered that reaction is greatly promoted by the employment of an acid catalyst. Any protic acid, that is, an acid which generates free protons, can be employed. These include inorganic acids, typically, hydrochloric acid, sulfuric acid, phosphoric acid, and the like, as well as organic acids, such as carboxylic acids, for example, acetic acid, propionic acid, and the like. The acid catalyst can also be generated $in$ $situ$ by employment in the reaction mixture of a catalytic quantity of, for example, trimethylchlorosilane. The trimethylchlorosilane present in the reaction mixture in a catalytic quantity will react with the acetamide, generating as by-product hydrochloric acid, and the hydrochloric acid will thus serve as the desired acid catalyst. Hydrochloric acid, either added directly or formed *in situ*, is a highly preferred catalyst, especially since ultimately, it reacts with the ammonia by-product to form ammonium chloride. Substantially, all of the ammonium chloride, by the time the reaction is completed, will have been eliminated from the reaction mixture by sublimation. The acid need be present only in a catalytic quantity, generally, from about 0.01 to about 5 mole percent based upon the acetamide.

A solvent can be employed in the process of this invention; however, none is required in order to achieve reaction of the hexamethyldisilazane with the acetamide. In the event that no solvent is employed, the solid acetamide and the liquid hexamethyldisilazane simply are mixed, stirred, and warmed to the desired temperature above about 40° C. As the reaction proceeds, the acetamide will slowly dissolve, and the N-trimethylsilylacetamide, which forms and which is a liquid at a temperature above about 40–50° C., will remain so when the conditions of the reaction are such that the temperature is maintained above about 40° C. Once the ammonia has been generated and has been removed from the reaction mixture, the resulting reaction mixture, upon cooling, crystallizes to form a cake of the desired N-trimethylsilylacetamide.

In the event that a solvent is employed, the resulting product generally will be isolated by removal of the solvent *in vacuo* at the conclusion of the period of reaction. Depending upon the intended use of the N-trimethylsilylacetamide, isolation from the solvent may not be necessary, and the product may well be readily employed in the form of its recovered solution. The solvent, should one be employed, must be one which is inert to the reactants as well as to the product, and, preferably is one which will dissolve little, if any, of the ammonia which is generated during the reaction. Retention of the ammonia in the reaction mixture will slow down the reaction due to the stabilized reaction mixture which thereby will be promoted. Also, it is preferred to select a solvent which has a boiling point in the range of the temperature of reaction. Thereby, the reaction can be carried out under reflux conditions. Suitable solvents which can be employed and which will not dissolve an appreciable amount of ammonia, include, for example, aromatic hydrocarbons, such as benzene, toluene, and the like; halogenated hydrocarbons, such as, chloroform, methylene chloride, ethylene dichloride, and the like; esters, such as ethyl acetate and the like; nitriles, such as acetonitrile, and the like; and ethers, such as tetrahydrofuran, diisopropyl ether, dioxane, and the like. A highly preferred class of solvents for the process of this invention are halogenated hydrocarbons, and specifically, methylene chloride. Other solvents which may retain ammonia can, of course, be employed; however, the ongoing of the reaction will tend to be diminished in direct proportion to the ability of the solvent to dissolve the ammonia by-product.

Preferably, the reaction will be carried out in an environment which precludes any appreciable quantity of moisture. Moisture is detrimental to the stability of both the hexamethyldisilazane reactant and the N-trimethylsilylacetamide product. Therefore, some precaution should be taken to ensure elimination from the reaction system of any substantial quantity of water. Sufficient elimination of water can be accomplished by employing normal precautions which, for example, may include purging the reaction system with dry nitrogen prior to carrying out the reaction.

Moreover, a stream of nitrogen can also be employed during reaction as an impetus to drive the generated ammonia from the reaction mixture. A continuous passage of nitrogen through the reaction mixture tends to serve as a carrier for the ammonia, sweeping it from the reaction mixture, and thereby shifts the equilibrium of the reaction in the direction of the desired product. Thus, it is a preferred feature of this invention to pass a stream of dry nitrogen through the reaction mixture during the period of reaction.

Generally, the reaction will be completed within a period from about 2.5 to about 30 hours. The length of reaction time will depend upon the particular set of reaction conditions which are employed, notably, whether any of the preferred reaction conditions delineated hereinabove are employed.

The following examples are provided to further illustrate the process of this invention. They are not intended to be limiting upon the general scope thereof.

Example 1

A mixture of 18.28 ml. (0.088 mole) of hexamethyldisilazane, 9.44 g. (0.160 mole) of acetamide, and 0.50 ml. (0.004 mole) of trimethylchlorosilane in 50 ml. of methylene chloride was prepared in a suitable reaction flask equipped with a water condenser. The mixture was heated to reflux at 47° C. The initially insoluble acetamide soon dissolved in the reaction mixture. Ammonium chloride formed and gradually collected in the condenser by sublimation from the reaction mixture. After about 5 hours the reaction mixture was a clear and colorless solution. Ammonia was generated and continued to escape from the reaction mixture. Refluxing was continued for a period long enough to ensure the generation and evacuation of all ammonia which formed. The total reflux time was about 23 hours.

The solvent in the reaction mixture was evaporated *in vacuo* employing a 40° C. bath. Crystallization occurred instantaneously upon removal of the flask from the water bath, and 20.8 g. (100% yield based on acetamide) of colorless, needle-like crystals were obtained which, by NMR analysis, were verified N-trimethylsilylacetamide.

The above procedure was carried out employing a variety of reaction conditions and reactant ratios, some of which are indicated by the following.

A ratio of 0.168 mole of hexamethyldisilazane, 0.320 mole of acetamide and 0.002 mole of trimethylchlorosilane in 25 ml. of methylene chloride was employed. This mixture was purged with nitrogen and heated to reflux at 65° C. for 5.75 hours. N-Trimethylsilylacetamide (39.5 g.; 95% yield) was isolated from the mixture in excellent purity.

The reaction was also carried out employing a higher temperature and a reduced excess of hexamethyldisilazane. Thus, a mixture of 0.164 mole of hexamethyldisilazane, 0.320 mole of acetamide, and 0.002 mole of trimethylchlorosilane in 20 ml. of methylene chloride was prepared. This mixture was purged with nitrogen and heated to reflux at 84–85° C. for 3.5 hours. Excellent N-trimethylsilylacetamide (38.6 g.; 92% yield) was obtained.

Various solvents have been employed, as follows:

A reaction mixture in tetrahydrofuran was maintained at 85° C. reflux for about 24 hours to obtain N-trimethylsilylacetamide in 95.5% yield.

The reaction mixture in acetonitrile at 95° C. reflux for 24 hours afforded N-trimethylsilylacetamide in 86% yield.

The reaction mixture in ethyl acetate refluxed at 90–100° C. for about 20 hours afforded N-trimethylsilylacetamide in 87.4% yield.

Example 2

This example demonstrates the reaction of hexamethyl disilazane and acetamide in the absence of a solvent.

A mixture of 18.28 ml. (0.088 mole) of hexamethyldisilazane, 9.44 g. (0.160 mole) of acetamide, and 0.50 ml. (0.004 mole) of trimethylchlorosilane was prepared. The resulting mixture was heated to a temperature of from about 64° C. to about 70° C. for one hour. Additional hexamethyldisilazane (1.64 ml.; 0.008 mole) was added dropwise to the reaction mixture over a 5 minute period. The mixture, a clear solution, was heated for an additional 2.5 hours at a temperature of from about 64° C. to about 70° C. The resulting mixture, a light pink liquid, was chilled to 40° C. and poured into a flask under a nitrogen atmosphere. Crystallization occurred after the mixture was seeded and brought to room temperature. The product, 18.10 g., was established by nmr as N-trimethylsilylacetamide, and was obtained in 86.5% yield. The presence of a small amount of unreacted acetamide was also detected. The presence of acetamide in the nmr analytical sample was diminished considerably by addition of hexamethyldisilazane to the nmr tube. The resulting nmr spectrum showed the presence of additional N-trimethylsilylacetamide and greatly diminished acetamide.

This reaction was also carried out under a modified set of conditions which employed only a total of 0.088 mole of hexamethyldisilazane and 0.008 mole of trimethylchlorosilane. The reaction mixture was maintained at a temperature of about 75° C. for a total of 3 hours, and 16.0 g. of excellent N-trimethylsilylacetamide product were obtained.

Another reaction was carried out employing 0.02 mole of hexamethyldisilazane, 0.02 mole of acetamide, and 1 drop of concentrated hydrochloric acid. The reaction mixture was maintained at 64° C. for one hour, and 2.0 g. of N-trimethylsilylacetamide were obtained.

We claim:

1. A process for preparing N-trimethylsilylacetamide, which comprises contacting hexamethyldisilazane with acetamide in a ratio of at least one mole of hexamethyldisilazane per each two moles of acetamide at a temperature of from about 40° C. to about 125° C. and for a period during which ammonia is generated from the mixture, and continuously removing the ammonia from the mixture during the period of its generation.

2. Process of claim 1, in which from about 0.01 to about 5 mole percent of aprotic acid, based upon the acetamide, is incorporated into the reaction mixture.

3. Process of claim 2, in which the acid is generated from trimethylchlorosilane.

4. Process of claim 2, in which a molar excess of from about 2.5% to about 30% of the hexamethyldisilazane based upon the stoichiometric requirement of the hexamethyldisilazane is employed.

5. Process of claim 4, in which the reaction is carried out for a period of from about 2.5 to about 30 hours.

6. Process of claim 5, in which the reaction is carried out at a temperature of from about 45° C. to about 90° C.

7. Process of claim 6, in which the reaction is carried out in the absence of a solvent.

8. Process of claim 6, in which the reaction is carried out in the presence of an inert solvent in which ammonia is substantially insoluble.

9. Process of claim 8, in which the solvent is methylene chloride.

10. Process of claim 9, in which the reaction is carried out under reflux conditions.

11. Process of claim 6, in which a stream of dry nitrogen is continuously passed through the reaction mixture during the time of reaction.

References Cited
UNITED STATES PATENTS

| | | | |
|---|---|---|---|
| 3,415,864 | 12/1968 | Gehrke et al. | 260—448.2 E |
| 3,776,933 | 12/1973 | Toporcer et al. | 260—448.2 E |
| 2,876,209 | 3/1959 | de Benneville et al. | 260—448.2 N X |
| 2,876,234 | 3/1959 | Hurwitz et al. | 260—448.2 N X |
| 3,397,220 | 8/1968 | Klebe | 260—448.2 E |

DANIEL E. WYMAN, Primary Examiner

P. F. SHAVER, Assistant Examiner

U.S. Cl. X.R.

260—448.2 N